United States Patent
Gurdiel Gonzalez et al.

(10) Patent No.: US 12,109,761 B2
(45) Date of Patent: Oct. 8, 2024

(54) GEOMETRICAL COMPENSATION IN ADDITIVE MANUFACTURING

(71) Applicant: HEWLETT-PACKARD DEVELOPMENT COMPANY, L.P., Spring, TX (US)

(72) Inventors: Enrique Gurdiel Gonzalez, Sant Cugat del Valles (ES); Manuel Freire Garcia, Sant Cugat del Valles (ES); Quim Muntal Diaz, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 668 days.

(21) Appl. No.: 17/296,521

(22) PCT Filed: Apr. 30, 2019

(86) PCT No.: PCT/US2019/029851
§ 371 (c)(1),
(2) Date: May 24, 2021

(87) PCT Pub. No.: WO2020/222791
PCT Pub. Date: Nov. 5, 2020

(65) Prior Publication Data
US 2022/0016845 A1  Jan. 20, 2022

(51) Int. Cl.
*B29C 64/00* (2017.01)
*B29C 64/393* (2017.01)
*G01B 11/24* (2006.01)
*B33Y 10/00* (2015.01)
*B33Y 50/02* (2015.01)

(52) U.S. Cl.
CPC ............ *B29C 64/393* (2017.08); *G01B 11/24* (2013.01); *B33Y 10/00* (2014.12); *B33Y 50/02* (2014.12)

(58) Field of Classification Search
CPC ... B29C 64/393; B29C 64/165; B29C 64/386; G01B 11/24; B33Y 10/00; B33Y 50/02; B33Y 50/00
See application file for complete search history.

(56) References Cited

U.S. PATENT DOCUMENTS

| 5,460,758 A | 10/1995 | Langer |
| 5,742,511 A | 4/1998 | Chasse |

(Continued)

FOREIGN PATENT DOCUMENTS

| CN | 108788143 A | * 11/2018 | ............. B33Y 10/00 |
| CN | 108883575 A | * 11/2018 | ........... B29C 64/393 |

(Continued)

*Primary Examiner* — Kandasamy Thangavelu
(74) *Attorney, Agent, or Firm* — Michael Dryja

(57) ABSTRACT

In an example, a method may include obtaining a first measurement of a first object generated using additive manufacturing apparatus based on object model data and obtaining a second measurement of a second object generated using the additive manufacturing apparatus based on object model data to which a first geometrical compensation parameter has been applied. An effect of the first geometrical compensation parameter may be determined based on the first and second measurements and, based on the determined effect, the first geometrical compensation parameter may be evaluated.

20 Claims, 5 Drawing Sheets

(56) References Cited

U.S. PATENT DOCUMENTS

| | | |
|---|---|---|
| 7,369,915 B2 | 5/2008 | Kritchman |
| 9,751,262 B2 | 9/2017 | Graham |
| 2014/0277664 A1 | 9/2014 | Stump |
| 2015/0148930 A1 | 5/2015 | Kumar |
| 2015/0352794 A1 | 12/2015 | Nguyen |
| 2016/0320771 A1 | 11/2016 | Huang |
| 2017/0173886 A1 | 6/2017 | Menchik |
| 2017/0341183 A1 | 11/2017 | Buller |
| 2017/0368753 A1* | 12/2017 | Yang ...................... G01B 21/20 |
| 2018/0071986 A1* | 3/2018 | Buller .................... B28B 1/001 |
| 2019/0054700 A1* | 2/2019 | Chandar ................. G06F 17/18 |
| 2021/0390219 A1* | 12/2021 | Gurdiel Gonzalez . B33Y 50/00 |

FOREIGN PATENT DOCUMENTS

| | | | | |
|---|---|---|---|---|
| CN | 109202074 A * | 1/2019 | ............. | B33Y 10/00 |
| CN | 109203479 A * | 1/2019 | ........... | B29C 64/386 |
| CN | 109340042 A * | 2/2019 | ............. | G06F 30/17 |
| WO | WO 2016115095 A1 * | 7/2016 | ........... | B29C 64/245 |
| WO | WO-2017011007 A1 | 1/2017 | | |
| WO | WO-2017086908 A1 | 5/2017 | | |

* cited by examiner

GEOMETRICAL COMPENSATION IN ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Figure 1:
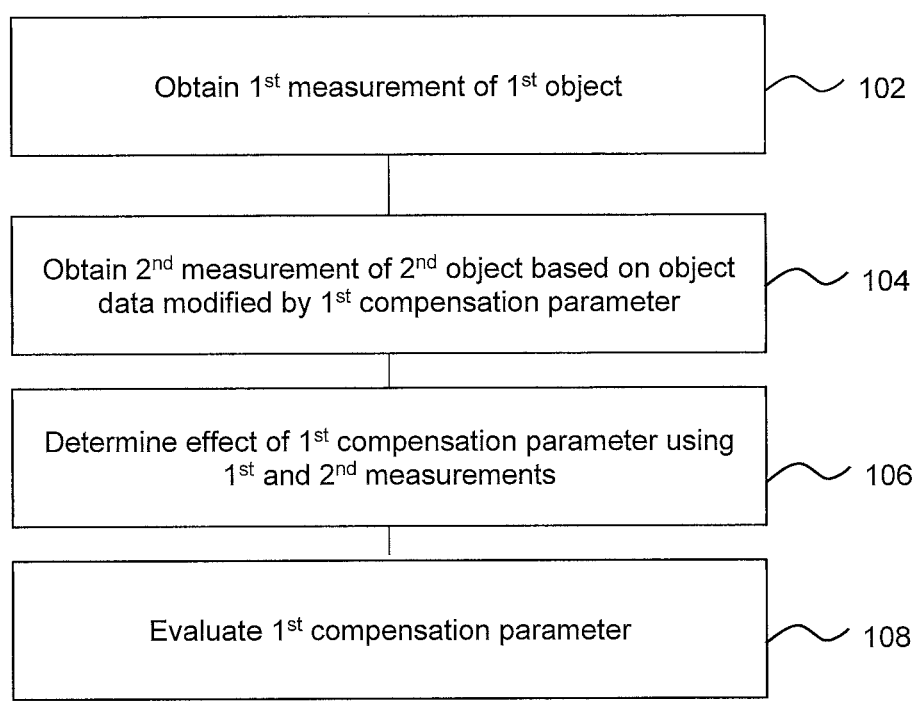
FIGS. 1 and 2 show example methods of evaluation of compensation parameter values in additive manufacturing.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved using heat, for example through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material heats up, coalesces and solidifies upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In examples, such a fusing agent may comprise any or any combination of an infra-red light absorber, a near infra-red light absorber, a visible light absorber and a UV light absorber. Examples of print agents comprising visible light enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed, and may for example act to cool, or otherwise reduce or prevent coalescence of the build material to which it is applied. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

FIG. 1 is an example of a method, which may comprise a computer implemented method which may be used to evaluate at least one geometrical compensation parameter value for use in additive manufacturing.

Geometrical transformations may be used to generate modifications of object model data, for example to apply a geometrical compensation in order to compensate for anticipated departures from intended dimensions when generating an object.

For example, it may be the case that when an object is generated in a process which includes heat, additional build material may adhere to the object on generation. In one example, fusing agent may be associated with a region of the layer which is intended to fuse. However, when energy is supplied, build material of neighbouring regions may become heated and fuse to the outside of the object (in some examples, being fully or partially melted, or adhering to melted build material as powder). Therefore, a dimension of an object may be larger than the regions to which fusing agent is applied. In order to compensate for this effect, i.e. where it is anticipated that an object may tend to 'grow' during manufacture in this manner, the object volume as described in object model data may be reduced to compensate for such growth. The reduction of the volume may be defined in a geometrical compensation (or geometrical transformation) model as at least one geometrical compensation parameter value.

In other examples, objects may be smaller following object generation than is specified in object model data. For example, some build materials used to generate objects may shrink on cooling. Therefore, a geometrical compensation/transformation model may specify at least one geometrical compensation parameter value to in turn specify how an object volume in object model data should be increased to compensate for the anticipated reduction in volume.

A particular object may be subject to mechanisms which result in growth and/or shrinkage, and the actual compensation to be applied may be determined by consideration of, or may be influenced by, the different degrees to which an object may be affected by such processes.

In some examples, a modification may be specified using geometrical compensation parameter value(s) comprising scaling and/or offset parameter value(s) (for example, a scaling factor and/or an offset value). A scaling factor may be used to multiply all specified dimensions in the direction of at least one axis by a value, which may be greater than 1 in order to increase the dimension(s) and less than 1 to reduce the dimension(s). An offset value may specify, for example by a specified distance or a number of defined sub volumes or 'voxels' (i.e. three-dimensional pixels), an amount to add or remove from a surface of the object (or a perimeter within a layer). For example, a distance as measured in the direction of a normal from the object surface may be specified and the object may be eroded or dilated (i.e., inflated or enlarged) by this distance.

In the examples set out herein, it is assumed that there is a predetermined geometrical compensation parameter value (or geometrical compensation model specifying geometrical compensation parameter value(s)) which has been selected for use.

Geometrical compensations may in some examples be determined based on a theoretical analysis of object generation, for example considering predicted temperatures and/or material behaviour characteristics. In some examples, such geometrical compensations may for example be determined by trial and error over time and/or using machine learning techniques. For example, geometrical compensations may be determined based on test objects, which may be generated and measured to characterise the deformations. In some examples, geometrical compensations may be generated using machine learning techniques based on deviations from expected dimensions in previously generated objects.

One example of a geometrical compensation may comprise one or a set of scaling and/or offset parameter values associated with a particular object generation apparatus, or type of object generation apparatus. The parameter values may be applied to all objects in the same way (for example, regardless of the object size and/or placement).

In other examples, a geometrical compensation model may allow a geometrical compensation derived or selected therefrom to be tailored to an intended object generation operation and/or object.

For example, a geometrical compensation model may take account of an intended location of an object in a fabrication chamber. It has been noted that dimensional deformation is related to the location of object generation when determining a compensation, and therefore different compensation parameter values may be applied for different object locations to improve accuracy. Such geometrical compensation models may therefore comprise or provide compensation parameter values which may be mapped to the intended location of an object (which may for example be a single identifiable point such as the location of the centre of mass of the object, or may include a consideration of the volumetric extent of the object).

For example, if an object is to be generated at a first location within the fabrication chamber, the location may be mapped to a geometrical compensation comprising one or more offset and/or scaling parameter value(s). However, if the same object were to be generated at a second location within the fabrication chamber, this second location may be mapped to a different geometrical compensation comprising one or more different offset and/or scaling parameter value(s). Thus, the particular geometrical compensation applied may vary between different locations based on predetermined mappings or the like.

In some examples, at least one geometrical compensation model may comprise a plurality of defined geometrical compensation parameter values (or parameter value sets), each associated with different locations within the fabrication chamber. In such examples, a particular geometrical compensation parameter value(s) may be selected based on the intended object generation location. In some examples, defined locations may be associated with geometrical compensation parameter value(s), and the geometrical compensation parameter value(s) to apply at locations intermediate to such defined locations may be generated for example by interpolation, or by selection of the closest defined location, or the like.

In other examples, characteristics of the object, such as consideration of the object volume and/or surface area, may be used as input parameters in a geometrical compensation model. For example, bulkier objects may accrue greater thermal energy than smaller objects, and may therefore tend to accumulate more heat than smaller objects. Cooling such objects may therefore take more time than cooling less bulky objects. This may lead to different deformations. Thus, in one example a first compensation model may comprise a compensation factor associated with object volume while in other examples there may be no such compensation factor, or a different compensation factor may be used. The surface area (and combinations of the volume and surface area) may be used to determine how 'solid' an object is. The amount of solid material in an object may be used to predict how the object may deform. For example, a more solid object may tend to accumulate more heat than a less solid object in a thermal fusing additive manufacturing operation. Such object generation parameters may therefore be mapped to different geometrical compensation parameter values within a geometrical compensation model.

Other geometrical compensation models may for example include a consideration of how many objects are to be generated in a fabrication chamber and/or the proximity of the objects (for example in terms of 'packing density').

In other examples, other object generation parameter values (which may be object generation parameter values which are configurable or selectable by a user or operator) may be considered. The object generation parameter value(s) may be any parameter value which may have an impact on dimensional inaccuracy. For example, the object generation parameter value(s) may comprise any, or any combination of, environmental conditions, object generation apparatus, object generation material composition (which may comprise selection of the type or composition of build material and/or print agents), object cooling profile or print mode. These may be specified, for example, by input to at least one processor. Thus different geometrical compensation models and/or different parameter values may be provided for different apparatus, different print modes, different cooling profiles or the like.

The geometrical compensation parameter value(s) and/or geometrical compensation model(s) specifying such parameter values may for example be stored in a memory, for example embodied as mapping resource(s) such as lookup tables and the like, or may be embodied as at least one algorithm, for example relating object generation parameter value(s) (e.g. any or any combination of object generation location, volume, surface area, packing density, environmental conditions, object generation apparatus, object generation material composition, object cooling profile or print mode) to at least one compensation parameter value to be applied to object model data.

Objects to be generated by the additive manufacturing apparatus may be described using object model data. The object model data may comprise data representing at least a portion (in some examples, a slice) of an object to be generated by an additive manufacturing apparatus by fusing a build material. The object model data may for example comprise a Computer Aided Design (CAD) model, and/or may for example be a STereoLithographic (STL) data file and/or may comprise a mesh or vector model. In some examples, the object model data may represent the object or object portion as a plurality of sub-volumes, wherein each sub-volume represents a region of the object which is individually addressable in object generation. In some examples herein, the sub-volumes may be referred to as voxels, i.e. three-dimensional pixels. In some examples, the object model data may represent a printable arrangement of a plurality of objects to be generated by an additive manufacturing apparatus by fusing build material within a fabrication chamber.

Methods of object generation may comprise determining object generation instructions (or 'print instructions') for generating the object. The object generation instructions in some examples may specify an amount of print agent to be applied to each of a plurality of locations on a layer of build material. For example, generating object generation instructions may comprise determining 'slices' of a virtual build volume comprising virtual object(s) (to which a modification such as a geometrical compensation or transformation may have been applied), and rasterising these slices into pixels (or voxels, i.e. three-dimensional pixels). An amount of print agent (or no print agent) may be associated with each of the pixels/voxels. For example, if a pixel relates to a region of a build volume which is intended to solidify, the object generation instructions may be generated to specify that fusing agent should be applied to a corresponding region of build material in object generation. If however a pixel relates to a region of the build volume which is intended to remain unsolidified, then object generation instructions may be generated to specify that no agent, or a coalescence modifying agent such as a detailing agent, may be applied thereto, for example to cool the build material. In addition, the amounts of such agents may be specified in the generated instructions and these amounts may be determined based on, for example, thermal considerations and the like.

Generating an object may comprise generating the object based on object generation instructions. For example, an object may be generated layer by layer. For example, this may comprise forming a layer of build material, applying print agents, for example through use of 'inkjet' liquid distribution technologies in locations specified in the object generation instructions for an object model slice corresponding to that layer using at least one print agent applicator, and applying energy, for example heat, to the layer. Some techniques allow for accurate placement of print agent on a build material, for example by using print heads operated according to inkjet principles of two dimensional printing to apply print agents, which in some examples may be controlled to apply print agents with a resolution of around 600 dpi, or 1200 dpi. A further layer of build material may then be formed and the process repeated, for example with the object generation instructions for the next slice. In other examples, objects may be generated using directed energy, or through use of chemical binding or curing, or in some other way.

The method of FIG. 1 may provide a method of evaluating at least one geometrical compensation parameter value. The method may be carried out based on measurement values of objects generated by an additive manufacturing apparatus. The objects from which measurement values are acquired may comprise a first object, which is generated based on first object model data and a second object using the additive manufacturing apparatus based on object model data (which may in some examples be the first object model data) to which a first geometrical compensation parameter value has been applied. In some examples, the geometrical compensation parameter value may be determined, selected or derived from a geometrical compensation model, examples of which have been described above. This may be used to modify the object model data, for example providing an object model which is enlarged or reduced in at least one dimension. Such geometrical modifications may comprise a parametrical transformation, for example a geometrical transformation such as at least one of an offset and a scaling factor. For example, a geometrical compensation parameter value may be specified as scaling and/or offset components in an X and Y axis (for example to be applied in a single slice of an object), or as scaling and/or offset components in an X, Y and Z axis.

In some examples, a geometrical modification parameter value may be characterised using two or three scaling factors (one for each of two/three axes, which may be orthogonal) and/or two or three offset values (one for each of two/three axes, which may be orthogonal). If scaling is not indicated in a given axis, the scaling factor in relation to that axis may be set to 1, and if no offset is indicated in a given axis, the offset value in relation to that axis may be set to 0.

Taking an example in which a scaling factor is specified in each of three orthogonal axes, this may in some examples be specified as a vector having components in the X, Y and Z directions, and may for example be specified as [SFx, SFy, SFz]. This may, for example, taking the object in its intended generation orientation, mean that the 'width' of the object is to be scaled by SFx, the 'depth' of the object is to be scaled by SFy, and the 'height' of the object is to be scaled by SFz (noting that, in practice, the object may be generated in any orientation, and therefore the height of the object during generation may not correspond to the height of the object as oriented for use thereof following generation).

Generating the second object may use any of the principles discussed above in relation to the first object, albeit being based on modified object model data.

Block 102 comprises obtaining a first measurement value of the first object, which was generated using an additive manufacturing apparatus based on object model data and block 104 comprises obtaining a second measurement value of the second object, which was generated using an additive manufacturing apparatus (which may be the same apparatus as generated the first object) based on object model data to which a first geometrical compensation parameter value has been applied. The first geometrical compensation parameter value may not have been applied to the to the object model data used in generating the first objet. In some examples the object model data on which generation of the first and second objects are generated may be the same. In some examples, obtaining the measurement values may comprise receiving the measurement values from a memory and/or over a communication link by a processor. In some examples, obtaining the measurement values may comprise measuring the objects. For example, such measuring may be carried out using at least one of 3D scanning, other optical measurement techniques and manual measurements. The measurement values may be acquired automatically in some examples. In some examples, a plurality of measurement values are acquired from at least one of the objects, and in some examples from both objects. The first and second measurement values may be taken from corresponding points on the first and second object. For example, the first and second measurement values may be taken along a predetermined axis and between corresponding points on the first and second object. For example, the first and second measurement values may both be taken from the widest point on the x-axis as the object was printed, or at a point which is a specified distance from one end of the object along the y-axis as the object was printed. More generally, the measurement values may, in some examples, taken between any arbitrary, but identified, points on the first and second objects and in a direction which may be specified using any or any combination of the X, Y and Z directions. The measurement values may be expressed as deviations from anticipated measurement values in some examples.

In some examples, the method may comprise generating the first and second objects.

It may be noted that, given that the second object was manufactured using object model data which had been modified by the geometrical compensation parameter value, it may generally be expected that, if this compensation performs well, the dimensions of the second object will be closer to the intended dimensions for the object (i.e. closer to the dimensions of the object as described in the object model data which was modified prior to object generation instructions being generated for the second object) than the first object.

Block 106 comprises determining, using at least one processor, an effect of the first geometrical compensation parameter value based on the first and second measurement values. As noted above, in some examples where the first and second objects are based on the same object model data (having been modified in the case of the second object), the expectation may be that these two measurement values will be different as specified by the compensation parameter value. In some examples the first and second measurement values may be scaled by the expected size of the measurement values prior to determining the effect of the compensation parameter value. In some examples, determining the effect of the compensation parameter value may comprise determining a magnitude of a difference between the second measurement value and the first measurement value, which may be an absolute or relative (e.g. percentage) difference.

In some examples, a second geometrical compensation parameter value is applied to the first measurement values using at least one processor to generate a modified first measurement value at this stage. In some examples, this may be intended such that, if the compensation parameter value is correctly defined for this object generation operation, the second measurement value and the modified first measurement value will be identical. In some examples, the first and second geometrical compensation parameter values may be the same. For example, if a scaling factor of 1.2 is applied in the x axis to the object model data as the first geometrical compensation parameter value, this is an indication that the object is expected to shrink when generated. Therefore, the first object may be expected to be smaller than the second object if based on the same underlying object model data (having been modified to generate the second object). If the x-axis dimensions of the first object are also scaled by 1.2, it may be expected that the modified first measurement value should be the same as a corresponding second measurement value if the compensation parameter value has successfully compensated for the actual shrinkage.

Block 108 comprises evaluating, using at least one processor (which may be the same as the processor used in block 106 in some examples), the first geometrical compensation parameter value based on the determined effect of the first geometrical compensation parameter value.

In some examples, this evaluation may be based on a magnitude of a difference between the second measurement value and the first measurement value (which may be determined in block 106). Based on the size of this difference (which may be an absolute or relative difference), the effectiveness of the first geometrical compensation parameter value may be assessed. In some examples, this may allow different compensation parameter values to be compared to evaluate their relative effectiveness. In other examples, the effect of the compensation parameter value may be compared to the compensation parameter value itself in order to evaluate the compensation parameter value. Examples of this are discussed in greater detail below.

In some examples, the evaluation may allow a correction of the compensation parameter value. For example, where the first measurement values is modified, if the second measurement value and the modified first measurement value have a difference of 1%, a 1% adjustment (which may increase or decrease the volume as appropriate) may be applied to the first geometrical compensation parameter value. In another example, if the second measurement value and the modified first measurement value differ by 0.2 mm, a 0.2 mm offset may be applied (added or subtracted as appropriate) to the first geometrical compensation parameter value. In other examples, combinations of such techniques may be used (i.e. the correction parameter value may comprise at least one of a factor and an offset). In other examples, the correction may be made by considering the difference between the effect of the first compensation parameter value on dimensions of the object generated, and the parameter value itself. For example, if the parameter value specifies a 3% increase in an object model dimension, and a 2% increase in that dimension is seen in the generated object, then this is an indication that the scaling parameter value is too small to achieve the intended aim and a correction may be applied to increase the parameter value. Such a process may be carried out iteratively until the measurement values of generated objects converge with the intended measurement values, at least to within a tolerance band.

While the above considers single pairs of measurement values, some examples, as set out below, the first and second measurement values may comprise data points in a larger dataset. Such a dataset may be used to derive a relationship between the first and second measurement values, and/or to derive a correction to apply to a compensation parameter value/geometrical compensation model. In some examples, further objects may be generated based on such a corrected compensation parameter value.

In this way, geometrical compensation models/parameter values which may perform well for some additive manufacturing apparatus/operations and not for others may be adapted. For example, a particular apparatus may be associated with a shift: a particular axis may be associated with a deformation which is fairly consistently under or over compensated for in a generic model. Such a shift may be taken into account by generating correction(s) to geometrical compensation parameter values and models.

In some examples, 'corrections' to tailor the geometric compensation parameter values to the first apparatus may be applied to a model as a whole (which may compensate well for 'shifts' in offsets and scales which have been noted between additive manufacturing apparatus). For example, a multiplicative factor or an offset may be associated (for example for each parameter value type and/or each axis) with an original geometrical compensation model and therefore effectively generates a new geometrical compensation model While in some examples, the first object is generated based on unmodified object data, in other examples, the first object is generated based on object data modified by a different geometrical compensation parameter value to that used to modify the object model data used to generate the first object (e.g. a second compensation parameter value). This may allow the effect of different compensation parameter values to be compared.

Figure 2:
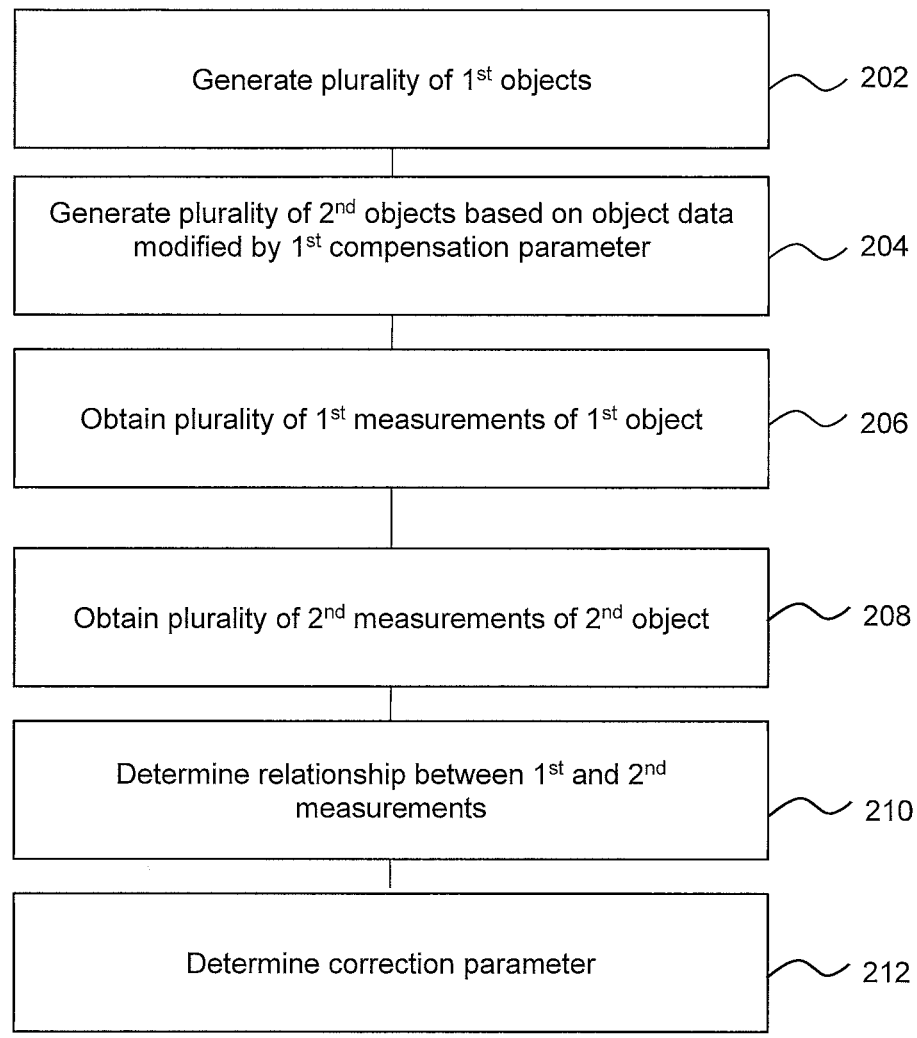

FIG. 2 is an example of a method in which larger datasets are acquired. By acquiring data sets from a plurality of objects, the impact of noise and/or errors may be reduced.

Block 202 comprises generating a plurality of first objects and block 204 comprises generating a plurality of second objects, wherein the first objects are based on object model data as described in FIG. 1 and the second objects are generated based on modified object model data. In some examples, the plurality of first and second objects are generated using the same additive manufacturing apparatus. In some examples, the plurality of first and second objects are generated using the same build material and/or object generation parameter values. In some examples, the first and second objects are generated based on the same original object model data (albeit that the model data may be modified in one build operation and not the other, or modified differently in the different build operations). In some examples, the first objects comprise a predetermined set of objects, and the second objects comprise the predetermined set. The first and/or second objects may comprise multiple instances of the same objects in some examples.

While in some examples, the parameter value used in modifying each of the second objects may be static and consistent, in other examples this parameter value may be variable. For example, the parameter value may vary depending on any, or any combination of, the location of object generation, the volume of the object, the surface area of the object, parameter values of the additive manufacturing apparatus used to generate the object, and/or any other factor which may result in a change in the applicable compensation parameter value.

Block 206 comprises obtaining a plurality of first measurement values of the first object and block 208 comprises obtaining a plurality of second measurement values of the second object. Corresponding measurement values may be acquired from 'pairs' of objects, wherein the first of a pair is one of the first objects and the second of the pair is one of the second objects. Block 210 comprises determining a relationship between the first and second measurement values. In some examples, this may comprise comparing the first and second measurement values to an expected measurement value and generating a 'best fit' data model. In some examples, the best fit model may be assumed to be a linear relationship, although in other examples other relationships may be determined/assumed. One example relating to a linear relationship which is assumed to exist between a linear relationship (which in some examples, may be a proportional relationship) between an effective transformation resulting from the application of the compensation model and a transformation specified by the compensation parameter value(s) is discussed in greater detail below.

Block 212 comprises determining a correction parameter value characterising the relationship, wherein the correction parameter value comprises at least one of a (multiplicative) factor and an offset value.

In a particular example, a geometrical compensation parameter value comprises a scaling factor, which is applied in a predetermined one of the x, y and z axes.

In this example, the compensation parameter value (scaling factor) is 1 if the object is not expected to deviate from the dimensions specified in object model data, less than 1 if the object is expected to grow in the predetermined axis in an object generation operation, and more than 1 if the object is expected to shrink in the predetermined axis in an object generation operation.

As explained above, the compensation parameter value may be evaluated by comparing data derived from measurement values of an object generated without the compensation parameter value applied to the object model data, with measurement values of generated object(s) with the compensations applied to the object model data.

In this example, a plurality of measurement values is taken at different specified points along each of a number of the first and second objects and the linear relationship is determined (e.g. derived or estimated), in this example, applied to underlying object model data. In some examples, at least three measurement values are taken from each axis to provide a linear regression estimate of scale and offset. In examples, hundreds or even thousands of measurement values may be acquired. In one example, around six measurement values are taken relating to each axis from around 100 objects which are well distributed throughout a fabrication chamber as they are generated to sample the whole volume of the fabrication chamber, and which are generated in particular object generation operations (i.e. around 600 measurement values per x y and z direction, or around 1800 measurement values in total).

In this example, the measurement values are selected so as to have different expected (or nominal) lengths.

The relationship between the acquired measurement values and nominal, (i.e. expected) lengths for a given first object generated using object model data indexed i are expected to have a linear relationship which may be modelled as follows:

First measurement value (i)=expected measurement value*a(i)+b(i)

where a is the slope of the linear relationship and b is the intercept.

Similarly, the relationship between the acquired measurement values and nominal lengths for a given second object generated using a modified version of the object model data indexed i which has been operated on by a compensation parameter value may be expected to have a linear relationship which may be modelled as follows:

Second measurement value(i)=expected measurement value*a'(i)+b'(i)

The ratio of the slopes, E(i) may be defined as E(i)=a'(i)/a(i), and evaluates the actual effective difference in scale between the first and second objects (offsets are considered separately below).

In this example, the correction parameter value applied is identified as F(i).

The expectation is that F(i)=E(i), i.e. the compensation parameter value is reproduced accurately in generated objects. If there are discrepancies between the effective and applied values it is possible to derive a functional dependency that allows correction of the compensation parameter value.

In an example based on test data, an empirically good fit for the relationship is:

$$(F(i)-1)=c(i)*(E(i)-1)+d(i)$$

where c is a correction factor and d(i) is an offset value. This relationship was derived heuristically. As the scaling factor is a multiplicative factor and therefore 1 is the identity transformation value, 1 is subtracted from the scale values in order to allow control on some properties, in particular to ensure that an identity transformation is not modified.

For a reasonably good model, d(i) should be a number with small absolute value, ideally 0, as the unitary scaling should have no effect on an offset, so this can be simplified to:

$$(F(i)-1)=c(i)*(E(i)-1)$$

Other relationships may be derived (empirically or based on theoretical analysis) for other test data. Moreover in other examples, the offset may be considered in the correction parameter values applied as discussed below.

For a dimensional profile DP(i), a corrected dimensional profile for this same part CDP(i), can be calculated as:

$$CDP(i)=1+(c*(DP(i)-1))$$

It may be noted that this corresponds to the relationship above, with the addition of 1 to both sides. While E(i) and F(i) are the effective and the applied scaling factors respectively, DP(i) and CPD(i) are the dimensional profile and the corrected dimensional profile, wherein the corrected dimensional profile is achieved by applying F(i) to DP(i).

The type of geometrical compensation transformation considered may have an impact on assumptions applied but the general principles may be as set out above. For example, considering an offset transformation (i.e. a transformation which is additive instead of multiplicative), an estimation of the offset may be determined from the intercept b, and the effective transformation could be written as:

$E_{offset}(i)=b'(i)-b(i)$, and could be compared to an offset specified in a compensation parameter value.

The functional dependency between the effective and applied geometrical transformation parameter values may therefore be derived. In some examples, if a reasonable fit may be is identified modelled (e.g. the model provides a reliable, repeatable output), then this is used to correct a compensation parameter value/model. For example, a 'goodness of fit' parameter value, such as a coefficient of determination, may be considered and the correction only applied if this parameter value is above a threshold. Such a correction may be used for a particular object and/or additive manufacturing apparatus.

In some examples, the method of FIG. 1 or FIG. 2 may be repeated for objects which are associated with different object generation parameter values. For example, the method(s) may be carried out separately for objects in different locations, objects of different volumes, objects of different surface area/volume ratio, objects generated using different additive manufacturing materials, objects generated using different additive manufacturing apparatus, etc. In this way, different corrections may be derived (in some examples for different compensation parameter values).

The method of FIGS. 1 and 2 may allow the first geometrical compensation parameter value to be tailored to the additive manufacturing apparatus and/or to object generation parameter values based on the apparatus/conditions of generation of the first and second objects. By repeating the methods for different object generation parameter values, geometrical compensation models which relate those object generation parameter values to specific compensation parameter values may be evaluated and/or improved by the use of corrections of the compensation factors/offsets.

Figure 3A:
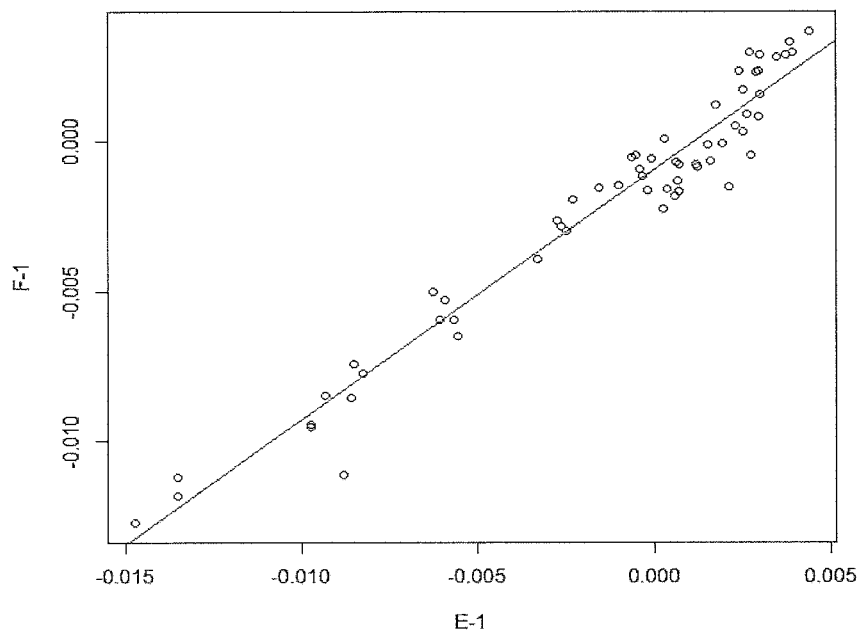
FIG. 3A-3C show examples of data acquired from generated objects.
Figure 3B:
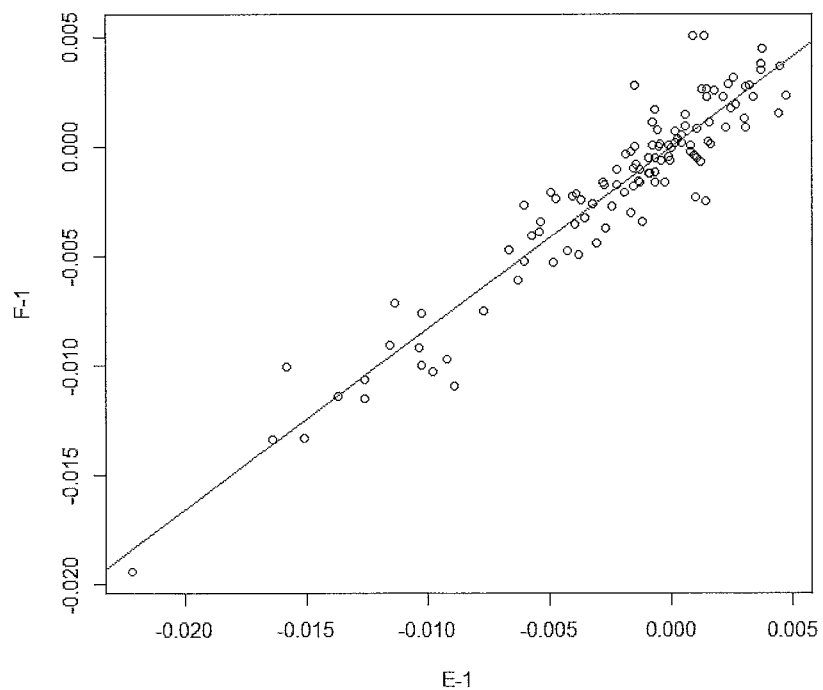
Figure 3C:
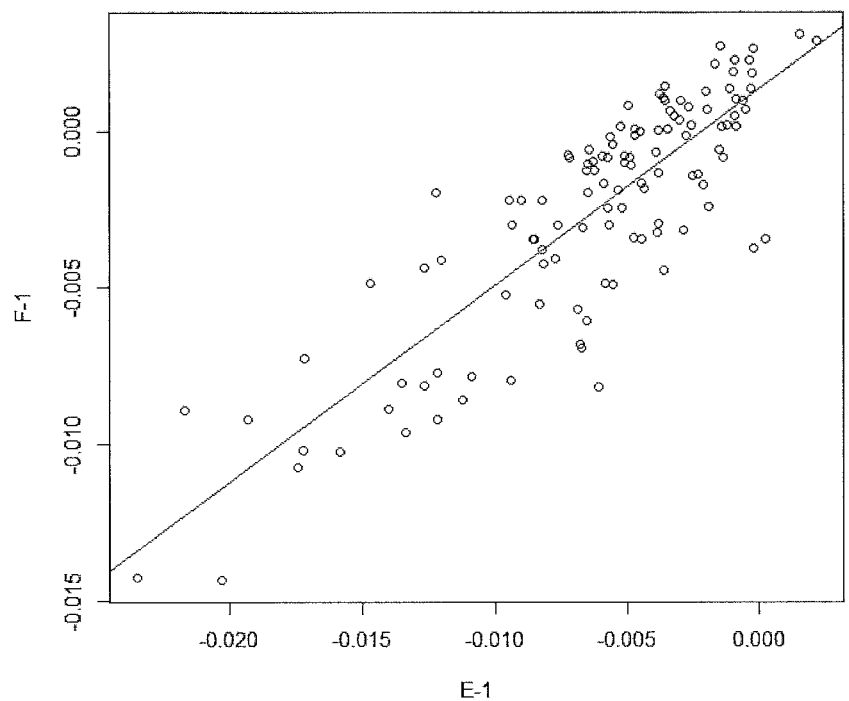

FIG. 3A-3C show some practical examples of such evaluations, in which a linear fit was applied and also demonstrate that different corrections may be applicable for different object generation parameter values.

The Figures show an applied geometrical compensation factor F plotted against the effective geometrical transformation E. In these examples, a scaling in the vertical (Z) direction was modelled based on two different build operations, wherein the applied scaling factor for each object depended on its location within a fabrication chamber (in this example, the location of each object's center of mass).

Each 'dot' in the Figure relates to two objects (an object pair), where one of the objects was generated in a first build operation and the other object was generated in a second build operation. The objects of a pair were generated in the same location in the respective build operations. Indeed in this example, the two build operations were substantially similar in terms of the materials used, the object generation parameter values/conditions, the number and form of objects generated and the location of each of those objects. However, in one of the build operations, the underlying object data was modified according to the geometrical compensation parameter value F for that object, whereas this was not the case in the other build operation. The value of F for each object was selected from a model which related the locations of objects within a fabrication chamber to values of F.

FIGS. 3A and 3B show results for objects generated using the same additive manufacturing apparatus and the same build material (PA12), but the generated objects were different. In FIG. 3A, the objects modelled had the form of two stepped pyramids joined base to base. In FIG. 3B, the objects modelled had the form of relatively elongate ladder-like objects oriented in different directions. The gradients are, respectively, 0.831 and 0.828, suggesting that F may need to be corrected to be smaller. However, the fact that the slopes are similar is suggestive that a reasonable model of the relationship may be based on a gradient of around 0.83. This is further supported by a regression analysis of the data which provides a Coefficient of determination (or "R-squared" value) of over 0.9 (noting that R-squared is a statistical measure of how close the data are to the fitted regression line, with 1 being indicative of a perfect fit).

FIG. 3C shows results for objects generated using again the same additive manufacturing apparatus but a different build material (PA11), generating the same type of objects as was used in generating the data for FIG. 3A. In this example, a clearly different gradient of 0.63 is determined. Thus, it can be seen that different correction parameter values may be used to generate a compensation parameter value which is tailored to a particular object generation parameter value. While in this example two different 'generic' models were tested (each with a position dependent scaling factor), it can be seen that the generic model for PA12 out-performed the generic model for PA11 in this example.

By using corrected compensation parameter values to modify object model data, an object once formed may end up being closer to an intended size. In some tests, the method has been shown to provide an overall improvement between 5% and 15% and has effectively reduced or even prevented over-correction by compensation parameter values applied in the vertical axis (i.e. reduced or prevented cases in which an object that was increased in size by a compensation parameter value was generated to be larger than the expected dimension or vice versa).

In some examples, the methods set out herein may be combined with other methods of object model modification. For example, a modification function may be employed in the vicinity, or locality, of small features. An erosion of such small features may result in an unacceptable reduction in their size, either obliterating the feature or rendering it too small to fuse or too delicate to survive cleaning operations. For example, if a feature has a dimension of around 0.5 mm, this may correspond to 12 voxels at 600 dpi. If three or four voxels are eroded from the side of such a small feature, it will lose approximately 50 to 60% of its cross-section, reducing its size to less than 0.3 mm. Such a feature may be too small to survive cleaning operations. Thus, in some examples, other functions may be used to ensure that small features are preserved.

Figure 4:
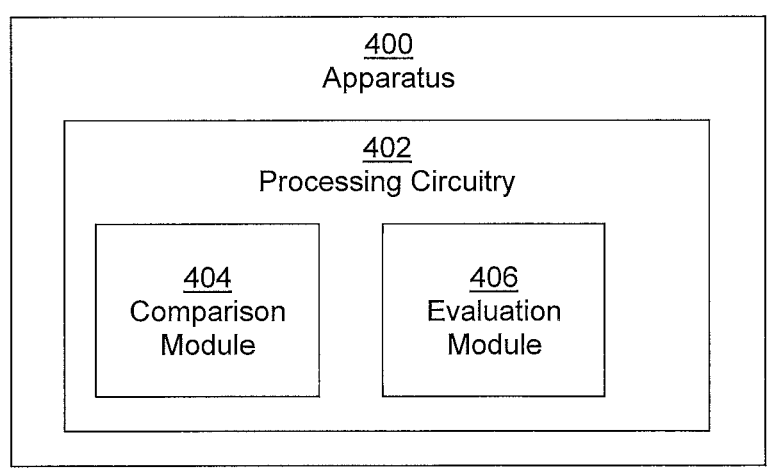
FIGS. 4 and 5 show simplified schematic drawings of example apparatus comprising processing circuitry.

FIG. 4 shows apparatus 400 comprising processing circuitry 402, the processing circuitry 402 comprising a comparison module 404 and an evaluation module 406.

In use of the apparatus 400, the comparison module 404 compares a first data set with a second data set, wherein the first data set is based on measurement values of at least one object printed using object model data, and the second data set is based on measurement values of at least one object printed using the object model data modified using a first compensation model to compensate for anticipated deformation in object printing (or object generation). In other words, the second data set may be derived from measurement values of objects printed by additive manufacturing apparatus based on object model data to which the first compensation model was applied, and a first data set derived from measurement values of objects printed by the additive manufacturing apparatus based on object model data to which the first compensation model was not applied.

For example, the comparison may comprise determining an effective transformation as set out above. In some examples, the effective geometrical transformation may be compared to the applied compensation model parameter value. In some examples, the comparison module 404 scales the first and second data sets by anticipated measurement values.

The evaluation module 506 may evaluate the first compensation model based on the comparison. For example, the evaluation may compare the effective transformation to the transformation specified by the first compensation model.

Figure 5:
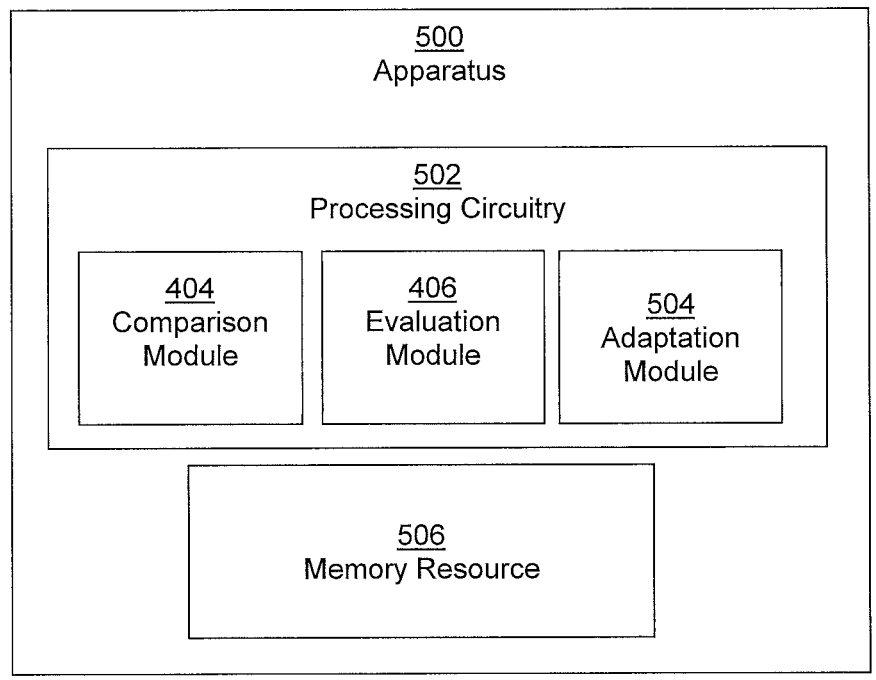

FIG. 5 shows apparatus 500 comprising processing circuitry 502, the processing circuitry 502 comprising the comparison module 404 and the evaluation module 406 described above and further comprising an adaptation module 504 and a memory resource 506 to store the first compensation model. For example, the first compensation model may comprise any or any combinations of a single compensation parameter value, a set of compensation parameter values, a mapping resource, a transformation vector(s), algorithm(s) or the like, and/or associated values, as have been described above. The first compensation model may be intended to compensate for object deformation in additive manufacturing. In some examples, there may be more than one compensation model and each compensation model may specify or determine a compensation to apply based on predetermined criteria, which may differ between models. In some examples, as has been discussed above, the geometrical compensation models may relate the compensation parameter value to be applied to any object generation parameter value such as object placement locations within a fabrication chamber, object volume, object surface area, or the like. The geometrical compensation models may have any of the features of the geometrical compensation models discussed above.

In use of the apparatus 500, the adaptation module 506 adapts the first model based on the comparison and/or the evaluation. For example, the adaptation module 506 may adapt the first compensation model based on at least one of a gradient or an offset of a linear regression associating the first and second data sets, as has been described above. In other examples, other relationships such as a polynomial relationship, or another relationship which may be derived from analysis of the data may be used instead of a linear relationship.

In some examples the apparatus 400, 500 may for example comprise a model modification module which may apply a geometric transformation for an object to be generated using additive manufacturing based on a geometrical compensation model such as the first compensation model (or the first compensation model as modified by the adaptation module 504) and may modify object model data using the geometrical transformation.

In some examples, the apparatus 400, 500 may comprise additive manufacturing apparatus which may generate objects including the objects which provide the measurement values for the first and second data sets. For example, an additive manufacturing apparatus, in use thereof, may generate the object in a plurality of layers (which may correspond to respective slices of an object model) according to the print instructions. The additive manufacturing apparatus may for example generate an object in a layerwise manner by selectively solidifying portions of layers of build material. The selective solidification may in some examples be achieved by selectively applying print agents, for example through use of 'inkjet' liquid distribution technologies, and applying energy, for example heat, to the layer. In other examples, heat may be selectively applied, and or chemical agents such as curing or binding agents may be applied. The additive manufacturing apparatus may comprise additional components not shown herein, for example any or any combination of a fabrication chamber, a print bed, printhead(s) for distributing print agents, a build material distribution system for providing layers of build material, energy sources such as heat lamps and the like.

The print instructions (or object generation instructions), which may be generated by the processing circuitry 402, 502, may control the additive manufacturing apparatus to generate each of the plurality of layers of the object. This may for example comprise specifying area coverage(s) for print agents such as fusing agents, colorants, detailing agents and the like. In some examples, object generation parameter values are associated with object model sub-volumes. In some examples, other parameter values, such as any, or any combination of heating temperatures, build material choices, an intent of the print mode, and the like, may be specified. In some examples, halftoning may be applied to determine where to place fusing agent or the like. The print instructions may be specified in association with sub-volumes (e.g. voxels as described above). In some examples, the print instructions comprise a print agent amount associated with sub-volumes.

In some examples, object generation may comprise a fusing process, for example a thermal fusing process in which heat is applied.

The processing circuitry 402, 502 or the modules thereof may carry out any of the blocks of FIG. 1 or FIG. 2.

Figure 6:
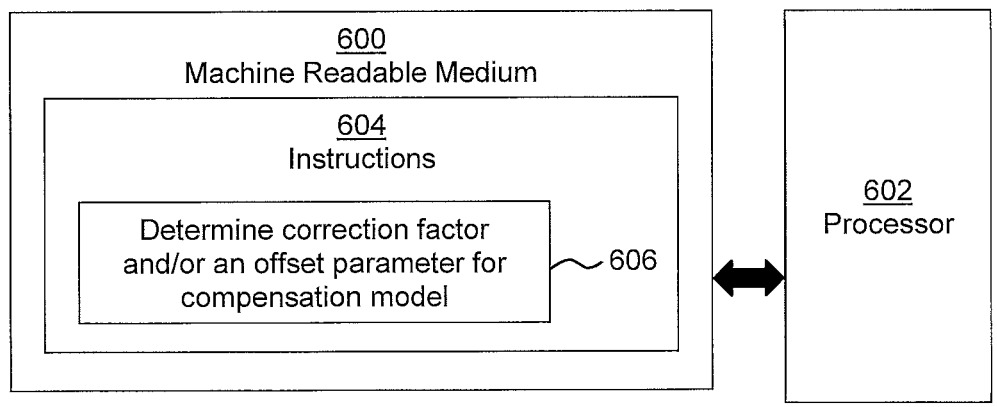
FIG. 6 is a simplified schematic drawing of an example machine-readable medium associated with a processor.

FIG. 6 shows a tangible machine-readable medium 600 associated with a processor 602. The machine-readable medium 600 comprises instructions 604 which, when executed by the processor 602, cause the processor 602 to carry out tasks. In this example, the instructions 604 comprise instructions 606 to cause the processor 502 to determine at least one of a correction factor and an offset parameter value (or parameter value) to adapt a compensation model for additive manufacturing by comparing a first data set derived from measurement values of objects printed by a 3D printer using object model data to which the compensation model was applied, and a second data set derived from measurement values of objects printed by the 3D printer using object model data to which the compensation model was not applied.

The compensation model may comprise at least one scaling factor and at least one offset value, wherein, in some examples, each of the scaling factors and each of the offset factors may be associated with one of three orthogonal axes.

In some examples, the instructions 604 comprise instructions which when executed cause the processor 602 to assume a linear relationship between an effective transformation resulting from the application of the compensation model and a transformation specified by the compensation model to determine the at least one correction factor/offset value. In other examples, a different relationship may be assumed or derived, for example from the measured data.

In some examples, the instructions when executed cause the processor 602 to carry out any of the blocks of FIG. 1 or FIG. 2. In some examples, the instructions may cause the processor 602 to act as any part of the processing circuitry 402, 502 of FIG. 4 or FIG. 5. The memory resource 506 may be provided by the machine-readable medium 600, or vice versa.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine-readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus (such as the comparison module 404, the evaluation module 406 and/or the adaptation module 504) may be implemented by a processor executing machine-readable instructions stored in a memory (e.g. the memory resource 506 or the machine-readable medium 600), or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
obtaining, by a processor, a first measurement value of a first version of an object, the first version generated using additive manufacturing apparatus and based on object model data;
obtaining, by a processor, a second measurement value of a second version of the object, the second version generated using the additive manufacturing apparatus and based on the object model data to which a geometrical compensation parameter value has been applied;
determining, by the processor, a difference between the first and second measurement values;
determining, by the processor, a result of application of the geometrical compensation parameter value to the object model data on which basis the second version of the object has been generated, using the difference between the first and second measurement values;
determining, using by the processor, a corrected geometrical compensation parameter value based on the determined result; and
generating, by the processor using the additive manufacturing apparatus, a target object based on target object model data to which the corrected geometrical compensation parameter value has been applied.

2. The method according to claim 1, further comprising, after determining the corrected geometrical compensation parameter value and before generating the target object:
obtaining, by the processor, a third measurement value of a third version of the object, the third version generated using the additive manufacturing apparatus and based on the object model data to which the corrected geometrical compensation value has been applied;
determining, by the processor, a difference between the first and third measurement values;
determining, by the processor, a result of application of the corrected geometrical compensation parameter value to the object model data on which basis the third version of the object has been generated, using the difference between on the first and third measurement values;
redetermining, by the processor, the corrected geometrical compensation parameter value, based on the determined result; and
generating, by the processor using the additive manufacturing apparatus, the target object based on the target object model data to which the redetermined corrected geometrical compensation parameter value has been applied.

3. The method according to claim 1, wherein determining the corrected geometrical compensation parameter value comprises applying at least one of a multiplicative factor value and an offset value to the geometrical compensation parameter value.

4. The method according to claim 1, wherein the first measurement value is one of a plurality of first measurement values of the first version of the object, the second measurement value is one of a plurality of second measurement values of the second version of the object, and determining the result comprises:
comparing the first and second measurement values to expected measurement values to derive a relationship between the first measurement values and the second measurement values.

5. The method according to claim 1, wherein the geometrical compensation parameter value is dependent on a location within a fabrication chamber of the additive manufacturing apparatus at which the second version of the object is generated.

6. The method according to claim 1, wherein the corrected geometrical compensation parameter value is dependent on an additive manufacturing material from which the first and second versions of the object have been generated.

7. A system comprising:
a processor; and
a memory storing instructions executable by the processor to:
obtain a first measurement value of a first version of an object, the first version generated using additive manufacturing apparatus and based on object model data;
obtain a second measurement value of a second version of the object, the second version generated using the additive manufacturing apparatus and based on the object model data to which a geometrical compensation parameter value has been applied;
determine a difference between the first and second measurement values;
determine a result of application of the geometrical compensation parameter value to the object model data on which basis the second version of the object has been generated, using the difference between the first and second measurement values;
determine a corrected geometrical compensation parameter value based on the determined result; and
generate, using the additive manufacturing apparatus, a target object based on target object model data to which the corrected geometrical compensation parameter value has been applied.

8. The system according to claim 7, wherein the instructions are executable by the processor to further, after determining the corrected geometrical compensation parameter value and before generating the target object:
obtain a third measurement value of a third version of the object, the third version generated using the additive manufacturing apparatus and based on the object model data to which the corrected geometrical compensation value has been applied;
determine a difference between the first and third measurement values;
determine a result of application of the corrected geometrical compensation parameter value to the object model data on which basis the third version of the object has been generated, using the difference between on the first and third measurement values;
redetermine the corrected geometrical compensation parameter value, based on the determined result; and
generate, using the additive manufacturing apparatus, the target object based on the target object model data to which the redetermined corrected geometrical compensation parameter value has been applied.

9. The system according to claim 7, wherein determination of the corrected geometrical compensation parameter value comprises application of at least one of a multiplicative factor value and an offset value to the geometrical compensation parameter value.

10. The system according to claim 7, wherein the first measurement value is one of a plurality of first measurement values of the first version of the object, the second measurement value is one of a plurality of second measurement values of the second version of the object, and determination of the result comprises:
comparing the first and second measurement values to expected measurement values to derive a relationship between the first measurement values and the second measurement values.

11. The system according to claim 7, wherein the geometrical compensation parameter value is dependent on a location within a fabrication chamber of the additive manufacturing apparatus at which the second version of the object is generated.

12. The system according to claim 7, wherein the corrected geometrical compensation parameter value is dependent on an additive manufacturing material from which the first and second versions of the object have been generated.

13. The system according to claim 7, wherein the additive manufacturing apparatus is part of the system.

14. The system according to claim 7, wherein the processor and the memory are part of an apparatus separate from the additive manufacturing apparatus.

15. A non-transitory machine-readable medium storing program code executable by a processor to perform processing comprising:
obtaining a first measurement value of a first version of an object, the first version generated using additive manufacturing apparatus and based on object model data;
obtaining a second measurement value of a second version of the object, the second version generated using the additive manufacturing apparatus and based on the object model data to which a geometrical compensation parameter value has been applied;

determining a difference between the first and second measurement values;

determining a result of application of the geometrical compensation parameter value to the object model data on which basis the second version of the object has been generated, using the difference between the first and second measurement values;

determining a corrected geometrical compensation parameter value based on the determined result; and generating, using the additive manufacturing apparatus, a target object based on target object model data to which the corrected geometrical compensation parameter value has been applied as opposed to the geometrical compensation parameter.

16. The non-transitory machine-readable medium according to claim 15, wherein the processing further comprises, after determining the corrected geometrical compensation parameter value, and before generating the target object:

obtaining a third measurement value of a third version of the object, the third version generated using the additive manufacturing apparatus and based on the object model data to which the corrected geometrical compensation value has been applied;

determining a difference between the first and third measurement values;

determining a result of application of the corrected geometrical compensation parameter value to the object model data on which basis the third version of the object has been generated, using the difference between on the first and third measurement values;

redetermining the corrected geometrical compensation parameter value, based on the determined result; and generating, using the additive manufacturing apparatus, the target object based on the target object model data to which the redetermined corrected geometrical compensation parameter value has been applied.

17. The non-transitory machine-readable medium according to claim 15, wherein determining the corrected geometrical compensation parameter value comprises applying at least one of a multiplicative factor value and an offset value to the geometrical compensation parameter value.

18. The non-transitory machine-readable medium according to claim 15, wherein the first measurement value is one of a plurality of first measurement values of the first version of the object, the second measurement value is one of a plurality of second measurement values of the second version of the object, and determining the result comprises:

comparing the first and second measurement values to expected measurement values to derive a relationship between the first measurement values and the second measurement values.

19. The non-transitory machine-readable medium according to claim 15, wherein the geometrical compensation parameter value is dependent on a location within a fabrication chamber of the additive manufacturing apparatus at which the second version of the object is generated.

20. The non-transitory machine-readable medium according to claim 15, wherein the corrected geometrical compensation parameter value is dependent on an additive manufacturing material from which the first and second versions of the object have been generated.

* * * * *